US009931768B2

(12) United States Patent
Mai et al.

(10) Patent No.: US 9,931,768 B2
(45) Date of Patent: Apr. 3, 2018

(54) CONVERSION STRUCTURE FOR A MOLDING SYSTEM

(71) Applicant: HUSKY INJECTION MOLDING SYSTEMS LTD., Bolton (CA)

(72) Inventors: Arnold Heinz Mai, Irrel (DE); Philippe Alexandre Metz, Thionville (FR); Michael Yvon Sevestre, Frechling (FR); Geoffrey Andrew Gow, Palgrave (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 0 days.

(21) Appl. No.: 14/646,161

(22) PCT Filed: Nov. 6, 2013

(86) PCT No.: PCT/CA2013/050842
§ 371 (c)(1),
(2) Date: May 20, 2015

(87) PCT Pub. No.: WO2014/089692
PCT Pub. Date: Jun. 19, 2014

(65) Prior Publication Data
US 2015/0283736 A1    Oct. 8, 2015

Related U.S. Application Data

(60) Provisional application No. 61/736,760, filed on Dec. 13, 2012.

(51) Int. Cl.
*B29C 33/30* (2006.01)
*B29C 45/26* (2006.01)
*B29C 45/17* (2006.01)

(52) U.S. Cl.
CPC ........ *B29C 33/301* (2013.01); *B29C 45/2673* (2013.01); *B29C 33/305* (2013.01);
(Continued)

(58) Field of Classification Search
CPC ... B29C 33/301; B29C 33/305; B29C 33/306; B29C 45/1742; B29C 45/2673; B29C 45/2675; B29C 2045/2677
See application file for complete search history.

(56) References Cited

U.S. PATENT DOCUMENTS 3,871,611 A * 3/1975 Taketa ................. B29C 33/306
249/102
4,867,668 A * 9/1989 Miyairi ............... B29C 45/2673
101/394
(Continued)

FOREIGN PATENT DOCUMENTS

CN    102470593 A    5/2012
GB    2190622 A1    11/1987
(Continued)

OTHER PUBLICATIONS

European search report, dated Jan. 23, 2017, 7 pages.
PCT International Search Report; Zhang, Pengfei; dated Dec. 11, 2013, 3 pages.

*Primary Examiner* — James P Mackey

(57) ABSTRACT

Disclosed herein, amongst other things, are various conversion structures for use in a molding system (100, 200). A non-limiting embodiment of the conversion structure includes a standard mold receiver (140, 157) and a mold conversion module (151A, 151B, 151C, 251A, 251B, 251C, 251D, 251E, 251F, 152A, 152B, 152C, 170A, 170B, 170C). The standard mold receiver (140, 57) and the mold conversion module (151A, 151B, 151C, 251A, 251B, 251C, 251D, 251E, 251F, 152A, 152B, 152C, 170A, 170B, 170C) are configured to cooperate, wherein the mold conversion mod- (Continued)

ule (151A, 151B, 151C, 251A, 251B, 251C, 251D, 251E, 251F, 152A, 152B, 52C, 170A, 170B, 170C) is receivable in the standard mold receiver (140, 157) for converting a molding configuration of a mold (120).

38 Claims, 16 Drawing Sheets

(52) U.S. Cl.
    CPC ........ *B29C 33/306* (2013.01); *B29C 45/1742* (2013.01); *B29C 45/2675* (2013.01)

(56) References Cited

U.S. PATENT DOCUMENTS

| | | | |
|---|---|---|---|
| 5,262,116 A | 11/1993 | Von Holdt, Sr. | |
| 6,196,824 B1 | 3/2001 | Foltuz et al. | |
| 7,204,685 B1 * | 4/2007 | Crain | B29C 45/2673 425/185 |
| 7,445,444 B2 * | 11/2008 | Guenther | B29C 45/2725 425/564 |
| 8,393,888 B2 * | 3/2013 | Halter | B29C 45/1769 425/556 |
| 8,740,610 B2 | 6/2014 | Halter et al. | |
| 2005/0084558 A1 * | 4/2005 | Scotti | B29C 45/2673 425/195 |
| 2008/0003321 A1 * | 1/2008 | Kerr | B29C 33/306 425/351 |
| 2009/0110764 A1 | 4/2009 | Kuo | |
| 2012/0107442 A1 | 5/2012 | Starkey | |

FOREIGN PATENT DOCUMENTS

| | | | |
|---|---|---|---|
| JP | 59-135134 | * | 8/1984 |
| JP | 3-190714 | * | 8/1991 |
| JP | H08132482 A | | 5/1996 |
| JP | 2001030310 A | | 2/2001 |
| WO | 0038899 A1 | | 7/2000 |
| WO | 0038900 A1 | | 7/2000 |

* cited by examiner

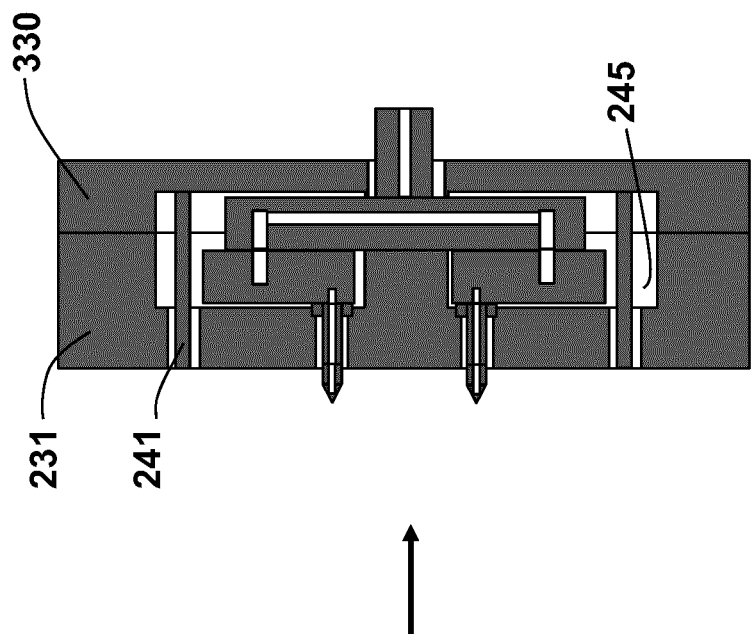
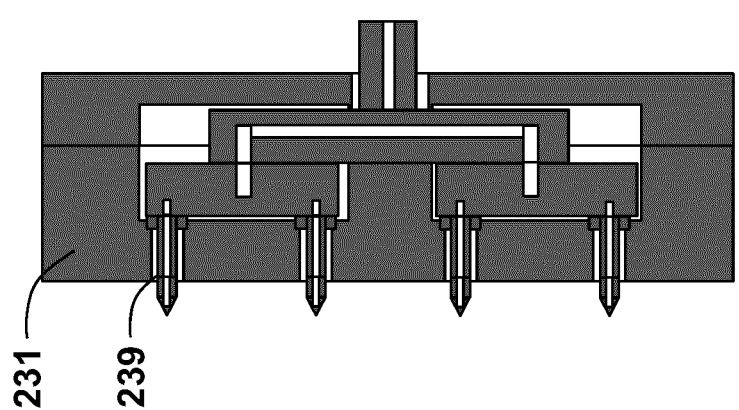
FIG. 12

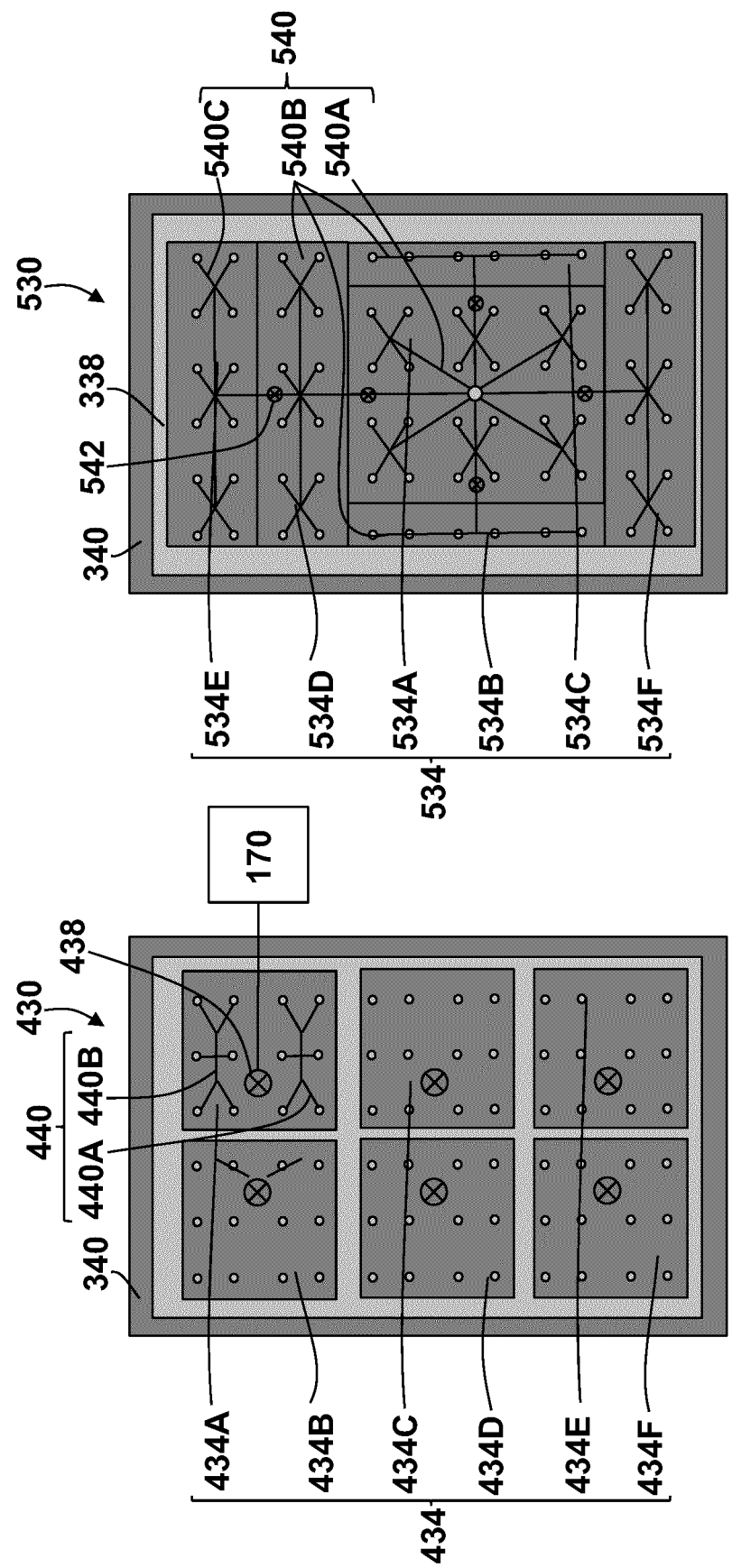

CONVERSION STRUCTURE FOR A MOLDING SYSTEM

TECHNICAL FIELD

Non-Limiting embodiments disclosed herein generally relate to various conversion structures for use in a molding system.

SUMMARY

In accordance with an aspect disclosed herein, there is provided a conversion structure for use in a molding system. The conversion structure includes a standard mold receiver that is configured to receive a mold conversion module for converting a molding configuration of a mold.

In accordance with another aspect disclosed herein, there is provided another conversion structure for use in a molding system. The conversion structure includes a mold conversion module that is configured to be received in a standard mold receiver for converting a molding configuration of a mold.

In accordance with a further aspect disclosed herein, there is provided a mold for use in a molding system. The mold includes a standard mold receiver and a mold conversion module. The standard mold receiver and the mold conversion module are configured to cooperate, wherein the mold conversion module is receivable in the standard mold receiver for converting a molding configuration of a mold.

In accordance with yet another aspect disclosed herein, there is provided a further conversion structure for a molding system. The conversion structure includes a molding material distributor that is configured to distribute molding material to a mold, wherein the molding material distributor is convertible to accommodate various molding configurations of the mold.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which:

FIGS. 12 to 17 depict the molding material distributor according to further non-limiting embodiments.

Figure 1:
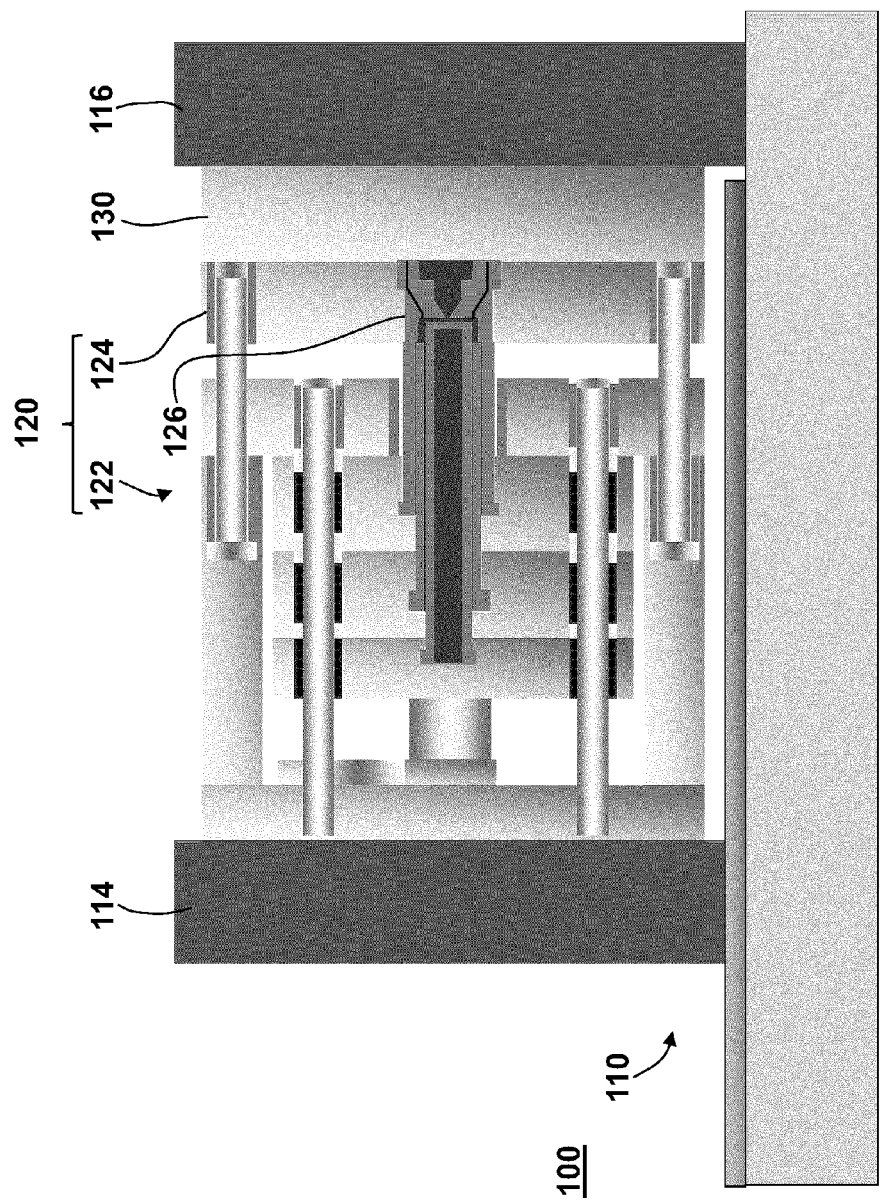
FIG. 1 depicts a schematic representation of a portion of a molding system according to a non-limiting embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a conversion structure for a molding system. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Introduction:

Those of skill in the molding arts, particularly those familiar with the molding of plastic materials, such as for example, injection molding, compression molding, thermoforming and the like, will appreciate that capital cost of providing tooling (i.e. mold, molding material distributor, and the like) for use in a molding system can be considerable.

Disclosed herein, amongst other things, are various non-limiting embodiments of conversion structures for use in a molding system with which to economically convert a molding configuration (i.e. shape, number and/or location of molding cavities) of a mold. These conversion structures aim to rationalize the parts of the tooling that actually need to modified or otherwise replaced to affect a change in the molding configuration.

One concept employed with some of these non-limiting embodiments is to standardize significant portions of the mold for re-use. In particular, this concept is to provide a standard mold shell (i.e. standard mold receiver) that is re-toolable using a conversion cassette (i.e. mold conversion module).

Another concept employed with some of these non-limiting embodiments is to integrate or otherwise move some of these standardized mold portions to a molding machine of the molding system. In particular, one or both of the standard mold receiver or a molding material distributor (e.g. hot runner) of the molding system may be integrated into a mold clamp of the molding machine.

In yet another concept employed with another of these non-limiting embodiments a molding material distributor (e.g. hot runner) of the molding system is configured to be convertible to accommodate a variety of molds or mold conversion modules having different molding configurations, such as, for example, mold cavitation (i.e. number of mold cavities—e.g. 4, 32, 48, 72, etc.) and mold pitch (i.e. geometric spacing of mold cavities). This may be accomplished by re-tooling standardized portions of the molding material distributor or simply by selectively adapting portions thereof. For example, the hot runner may include distribution components that can be simply 'turned-off'. Alternatively, the hot runner may have a manifold layout that accommodates conversion thereof (e.g. selectively operate manifolds to configure the hot runner for different cavitations).

A technical effect of the foregoing may include the ability to re-use expensive components of the tooling (e.g. hot runner and mold) for multiple applications. Not only would this provide for less expensive tooling but it would also allow for an extended financial depreciation thereof.

Non-Limiting Embodiments of a Mold:

With reference to FIG. 1 there is depicted a schematic representation of part of a molding system 100 in accordance with a non-limiting embodiment. In particular, there is depicted a mold clamp 110 of the molding system 100 having a mold 120 arranged therein that may be converted, in use, to different molding configurations.

The mold 120 includes a first mold part 122 and a second mold part 124 that when closed together define a plurality of molding cavities within which molded articles, such as, for example, closures of the type for capping containers, are moldable. The first mold part 122 is mounted to a moving platen 114 of the mold clamp 110. The second mold part 124 is mounted to a molding material distributor 130 which in turn is mounted on a stationary platen 116 of the mold clamp 110. In operation, the first mold part 122 may be reciprocated relative to the second mold part 124 for opening and closing the mold 120 through relative movement between the moving platen 114 and the stationary platen 116. Alternatively, the mold 120 may be operated without requiring the reciprocation of the mold parts as will be described later herein.

Figure 2:
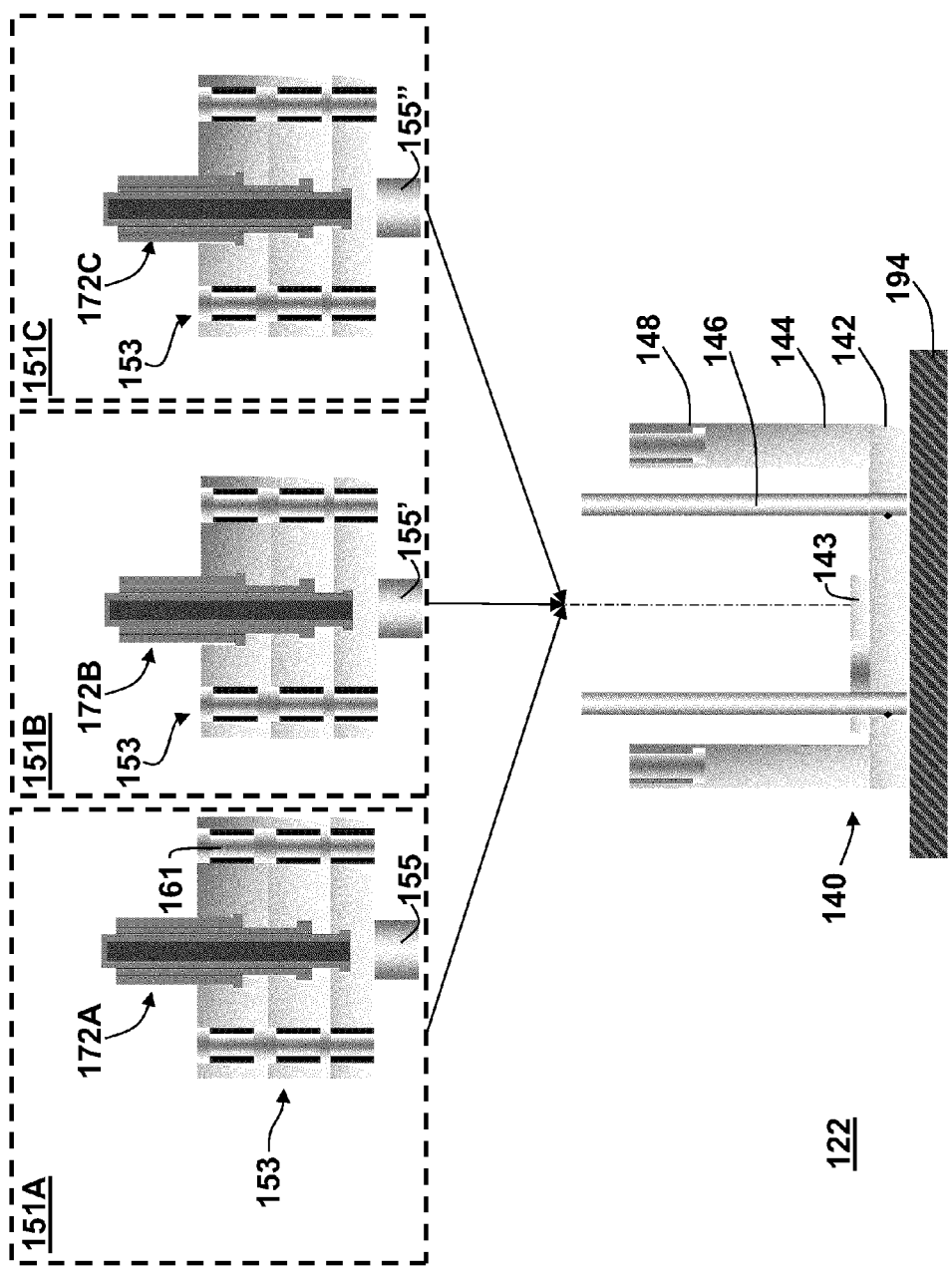
FIG. 2 depicts various mold conversion modules for use with a standard mold receiver according to a non-limiting embodiment.
Figure 3:
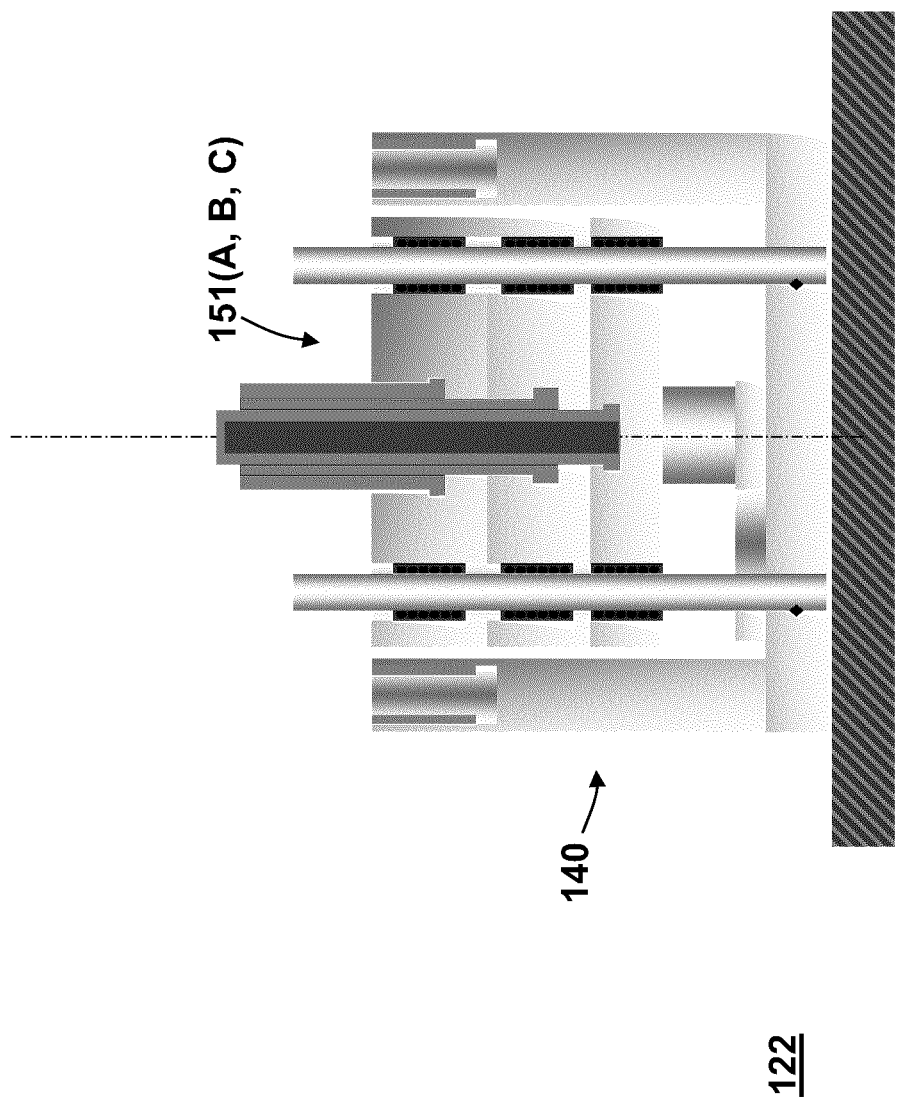
FIG. 3 depicts a first mold portion of the mold that includes one of the set of mold conversion modules arranged in the standard mold receiver.

With reference to FIG. 2, it may be appreciated that a conversion structure of the molding system 100 may include elements of the first mold part 122. In particular, the conversion structure may be structured to include a standard mold receiver 140 and one or more mold conversion modules 151A, 151B, 151C. As may be appreciated with further reference to FIG. 3, the standard mold receiver 140 and the mold conversion modules 151A, 151B, 151C are configured to cooperate, wherein each mold conversion module 151A, 151B, 151C is receivable in the standard mold receiver 140 for converting a molding configuration of the mold 120. In this non-limiting example, the molding configuration converted by the different mold conversion modules 151A, 151B, 151C is the shape of the molded articles (not shown) molded therewith. That being said, the mold conversion module 151A, 151B, 151C could otherwise be configured to convert, for example, a cavitation of mold cavities 126 in the mold 120 (i.e. a number of mold cavities defined therein) and/or a pitch of the mold cavities in the mold 120 (i.e. a spacing of the mold cavities in the mold).

Referring back to FIG. 2, it may be further appreciated that each of the mold conversion modules 151A, 151B, 151C may be configured to include a standard mold base 153. Each of the mold conversion modules 151A, 151B, 151C further include a first stack portion 172A, 172B, 172C, respectively, that define, a first part of differently configured mold cavities 126. A more detailed description of the standard mold base 153 and of the first stack portion 172A, 172B, 172C will be provided later herein.

Figure 10:
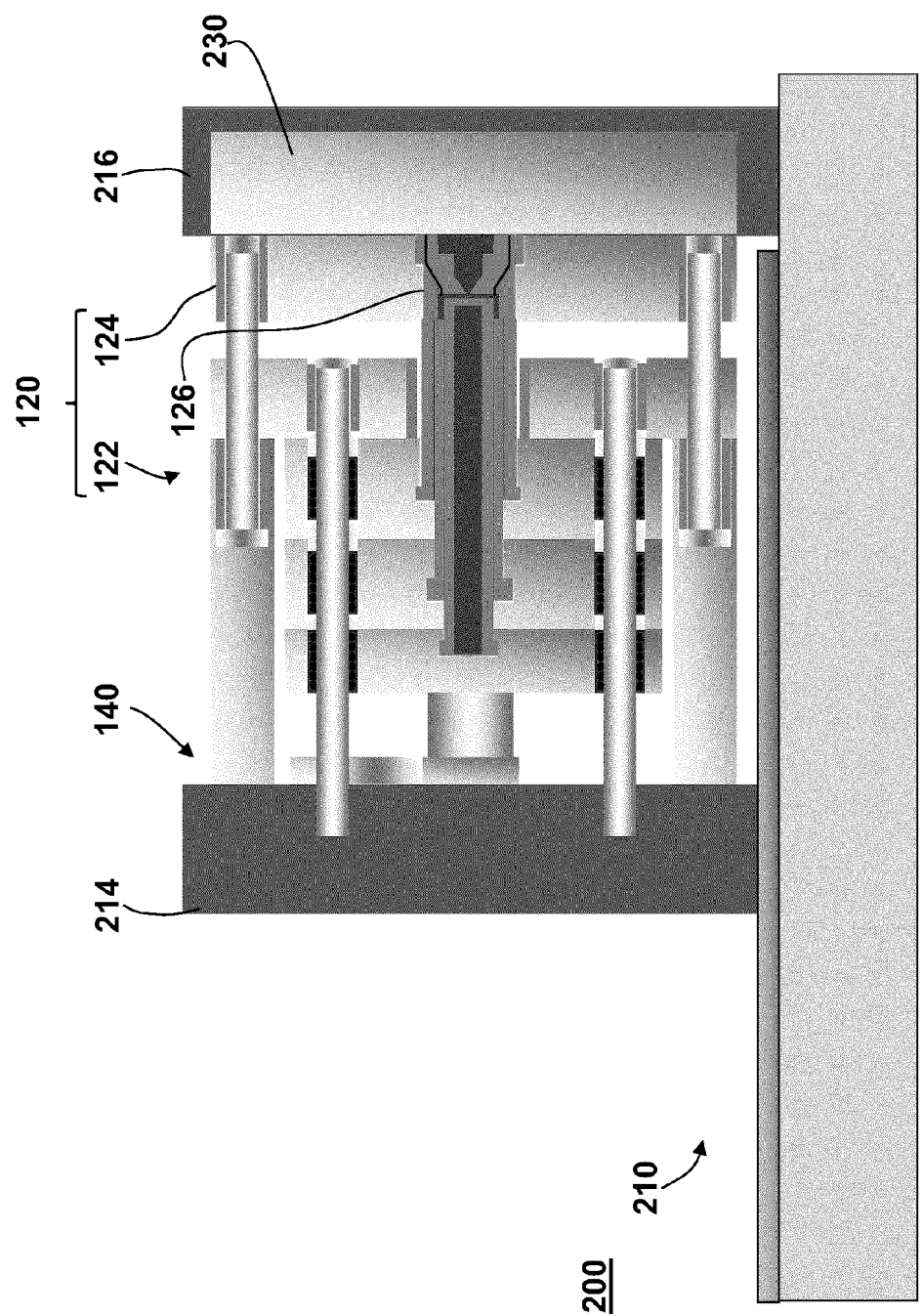
FIG. 10 depicts a schematic representation of a portion of a molding system according to another non-limiting embodiment.

The standard mold receiver 140 is configured for mounting to the platen 114 of the mold clamp 110 of a molding system 100. In another non-limiting embodiment, as shown in FIG. 10, the standard mold receiver 140 may instead be integrated with a platen 214 of a mold clamp 210 in a molding system 200. Either way, the standard mold receiver 140 is configured to include a subset of components that would otherwise be common to a set of different molds having different molding configurations.

In this example, the standard mold receiver 140 includes a guide 146 that is configured to cooperate with a complementary guide 161 on the mold conversion module 151A, 151B, 151C for accommodating repositioning, in use, of the mold conversion module 151A, 151B, 151C between a molding position and an ejection position.

The standard mold receiver 140 may further includes a shutter device 142 that is operable, in use, to selectively permit the repositioning of the mold conversion module 151A, 151B, 151C between the molding position and the ejection position. The structure and operation of the shutter device 142 is fully described with reference to PCT publication 2011/063499 to Halter et al., published on Jun. 2, 2011. Suffice it to state that the shutter device 142 includes a shutter member 143 that is configured to cooperate with a link member 155 on the mold conversion module 151A, 151B, 151C, wherein the shutter member 143 is repositionable, in use, to selectively permit the repositioning of the mold conversion module 151A, 151B, 151C. In particular, the shutter member 143 may be alternately positioned to: a) block a rearward motion of the mold conversion module 151A, 151B, 151C and thereby hold it in the molding position; and b) allow the mold conversion module 151A, 151B, 151C to be repositioned to affect ejection of molded article(s) from therefrom.

Figure 4:
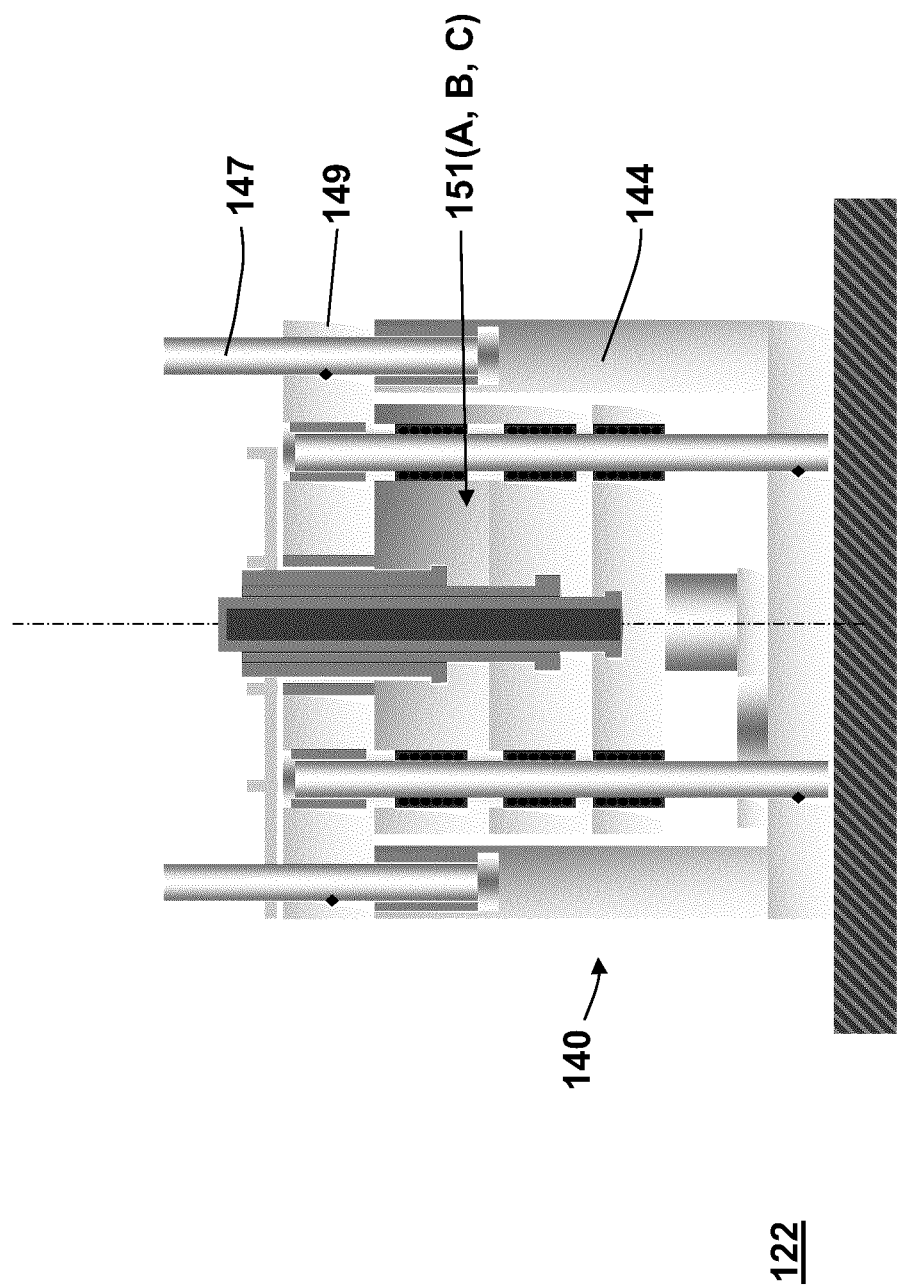
FIG. 4 depicts the first mold portion of FIG. 3 further including an auxiliary device that is associated with the standard mold receiver.

The standard mold receiver 140 may further include an ejector box 144 for framing the mold conversion module 151A, 151B, 151C at least in part. As may be appreciated with reference to FIG. 4, the ejector box 144 is configured to support an auxiliary device 149 mounted thereto. The auxiliary device 149 may include, for example, a front plate or an in-mold transfer device that is configured to transfer, in use, the molded article from the mold 120. Non-limiting examples of the in-mold transfer device are described in the foregoing PCT publication 2011/063499 and in PCT publication 2011/069237 to Glaesener et al., published on Jun. 16, 2011.

Conversion of the mold 120 such as, for example, the replacement of the mold conversion module 151A, 151B, 151C (in entirety or in part) or the addition or removal of some optional plate package (i.e. to add or remove functionality to the mold) may change the overall height thereof. A change in height of the mold conversion module may be accommodated with replacement of the link member 155, 155', 155". Specifically, with increase or decrease in the height of the mold conversion module the link member may be shortened or lengthened, respectively.

Figure 5:
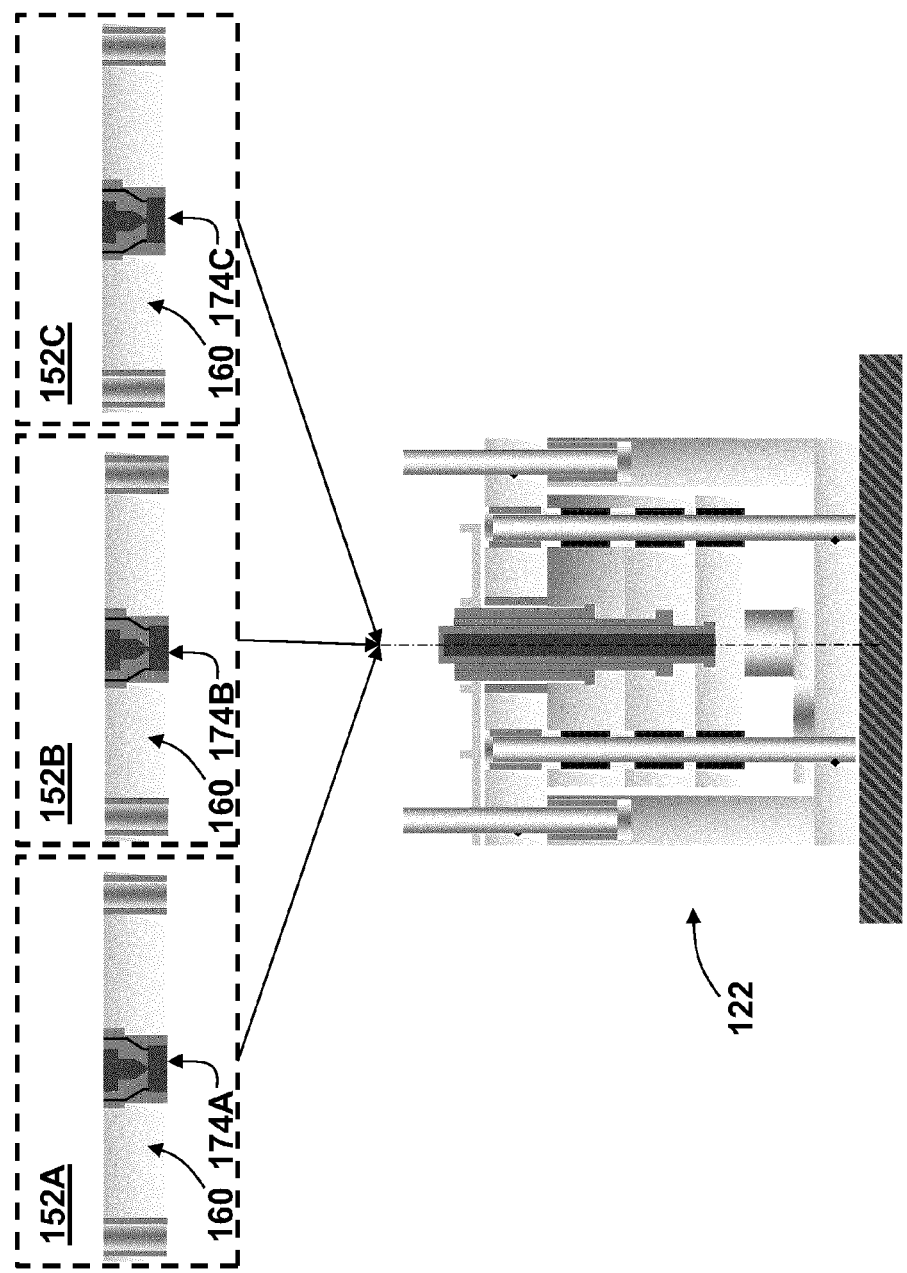
FIG. 5 depicts the first mold portion of FIG. 4 and various mold conversion modules for use with a second mold portion of the mold.
Figure 6:
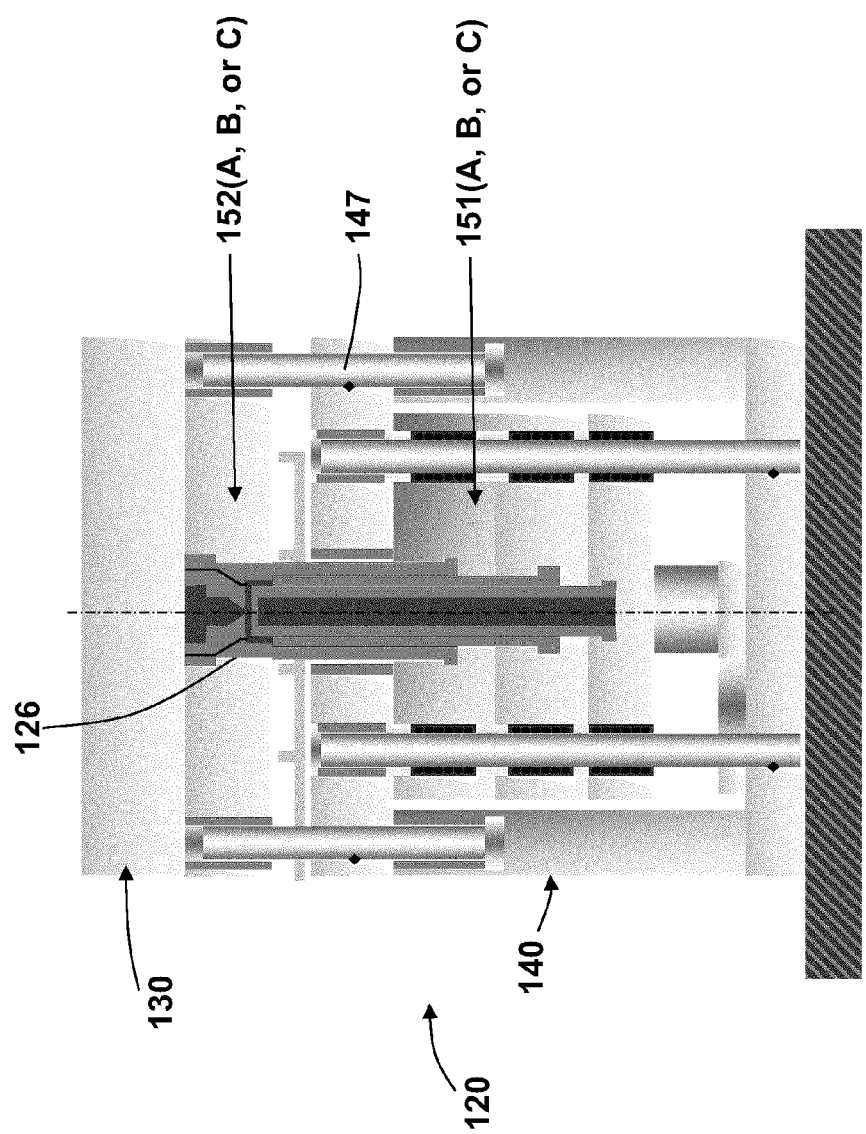
FIG. 6 depicts the mold further including a molding material distributor.

With reference to FIG. 5 it may be appreciated that the conversion structure may further include additional mold conversion modules 152A, 152B, 152C with which to convert the molding configuration of the second mold part 124. Each of the mold conversion modules 152A, 152B, 152C may include a standard mold base 160. In addition, each of the mold conversion modules 152A, 152B, 152C further include a second stack portion 174A, 174B, 174C associated therewith, respectively, wherein the second stack portions 174A, 174B, 174C are configured to define a remaining part of the differently configured mold cavities 126. A more detailed description of the standard mold base 160 and of the second stack portion 174A, 174B, 174C will be provided later herein.

With reference to the sequence of FIGS. 2 to 6, it may be appreciated that the conversion structure of the mold 120 may be assembled on a bench 194 (FIG. 2). In particular, in a first step, as shown with reference to FIG. 3, a selected mold conversion module 151A, 151B, 151C is received in the standard mold receiver 140. Next, as shown with reference to FIG. 4, the auxiliary device 149 is then received on the ejector box 144 of the standard mold receiver 140. Next, as shown with reference to FIG. 6, a selected mold conversion module 152A, 152B, 152C is then received and aligned to the standard mold receiver 140 with assistance from one or more guides 147. In the last step before arranging the mold 120 in the mold clamp 110 (FIG. 1) the molding material distributor 130 is connected mounted to the second mold part 124 (i.e. the selected mold conversion module 152A, 152B, 152C).

Figure 7:
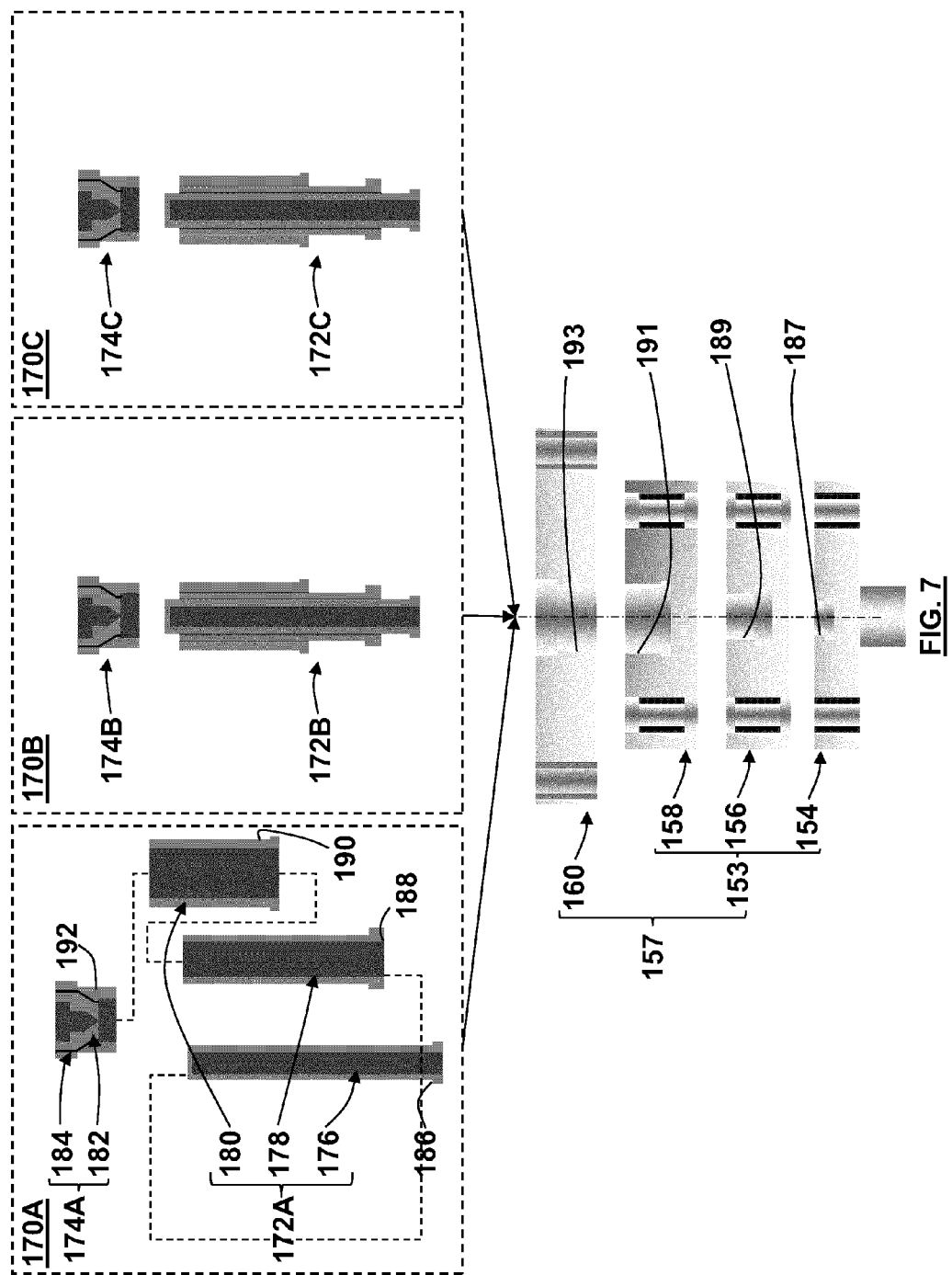
FIG. 7 depicts various mold conversion modules for use in a standard mold receiver of the mold in accordance with a further non-limiting embodiment.

With reference to FIG. 7 there is depicted various mold conversion modules 170A, 170B, 170C for use in the standard mold receiver 157 of the mold in accordance with a further non-limiting embodiment.

Each of the mold conversion modules 170A, 170B, 170C may include one or both of the first stack portion 172A, 172B, 172C and the second stack portion 174A, 174B, 174C introduced earlier. Likewise, the standard mold receiver 157 may include one or both of the standard mold bases 153, 160 introduced earlier.

As shown, the standard mold bases 153, 160 define one or more standard interfaces that are configured to cooperate with one or more complementary standard interfaces that are defined on the first stack portion 172A, 172B, 172C and the second stack portion 174A, 174B, 174C.

By providing standard interfaces the stack portions may be readily replaced to reconfigure the mold 120 while re-using the standard mold bases 153, 160.

More specifically, the standard mold base 153 may be configured to include a plurality of plates, such as, for example, an inner core plate 154, an outer core plate 156 and a stripper plate 158 that define a standard inner core interface 187, a standard outer core interface 189 and a standard stripper interface 191, respectively, for cooperating with a complementary standard inner core interface 186, a complementary standard outer core interface 188 and a complementary standard stripper interface 190 that are defined on an inner core 176, an outer core 178 and a stripper sleeve 180, respectively, of the first stack portion 172A, 172B, 172C. Likewise, the second stack portion 174A, 174B, 174C may include a cavity insert 184 that defines a complementary standard cavity interface 192 that is configured to cooperate, in use, with a standard cavity interface 193 that is defined on the cavity plate of the standard mold base 160. The cavity insert 184 may further include a gate insert 182 arranged therein.

Figure 8:
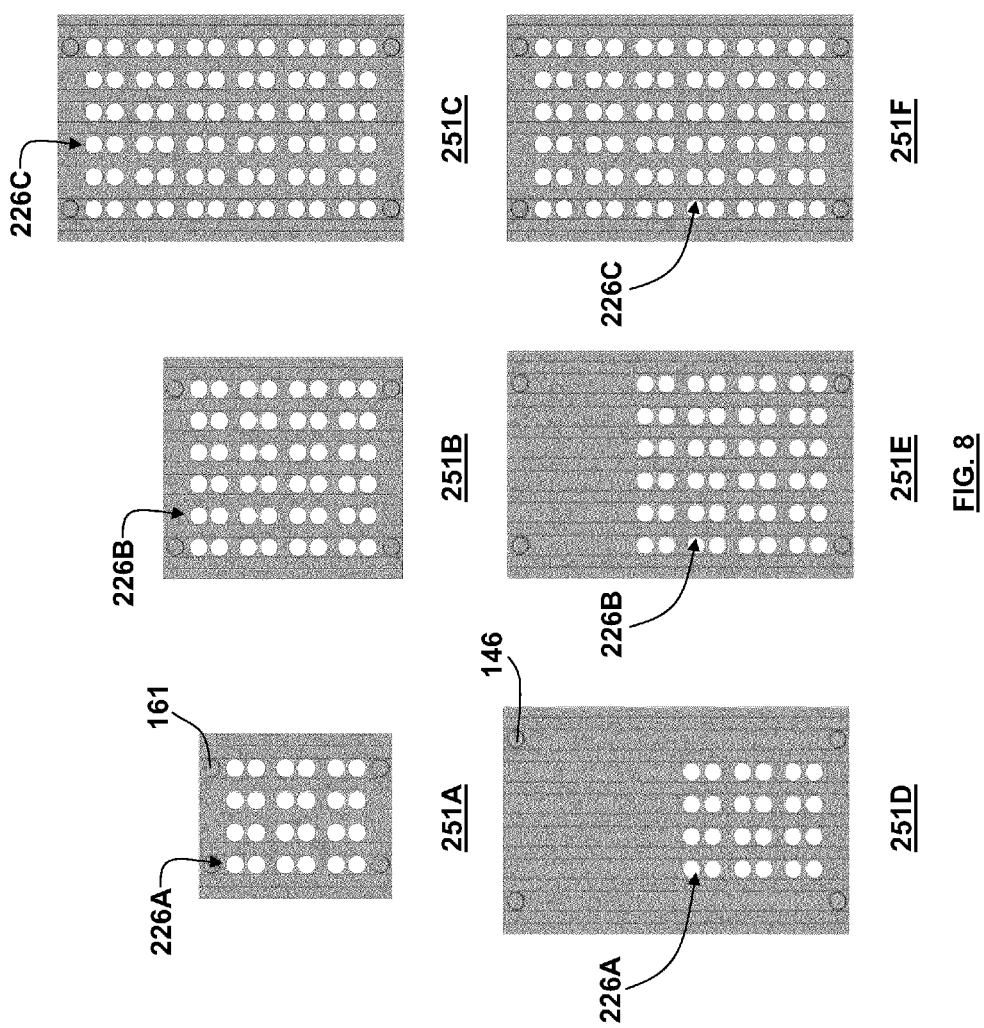
FIG. 8 depicts a front view of various mold conversion modules according to another non-limiting embodiment.

With reference to FIG. 8 there is depicted yet more non-limiting embodiments of the mold conversion modules 251A, 251B, 251C, 251D, 251E, 251F that may be selected from to reconfigure the mold 120 (FIG. 1). The mold conversion modules 251A, 251B, 251C, 251D, 251E, 251F have different molding configurations in that they define different numbers of mold cavities 226A, 226B, 226C, specifically, 24, 48 and 72 cavities, respectively. Of note, the mold conversion modules 251A, 251B and 251C are shown as having different locations for the complementary guides 161 thereon, recalling that these guides cooperate, in use, with the guides 146 on the standard mold receiver 140. As such, the standard mold receiver 140 may be further configured to accommodate relocation of the guides 146 therein. Alternatively, the standard mold receiver 140 may instead have fixed locations for the guides 146 and the mold conversion modules 251D, 251E, 251F (FIG. 8) may be configured accordingly. That is, the mold conversion modules 251D, 251E and 251F have common locations for the guides 161 different locations for the complementary guides 146 thereon, recalling that these guides cooperate, in use, with the guides 146 on the standard mold receiver 140.

Figure 9:
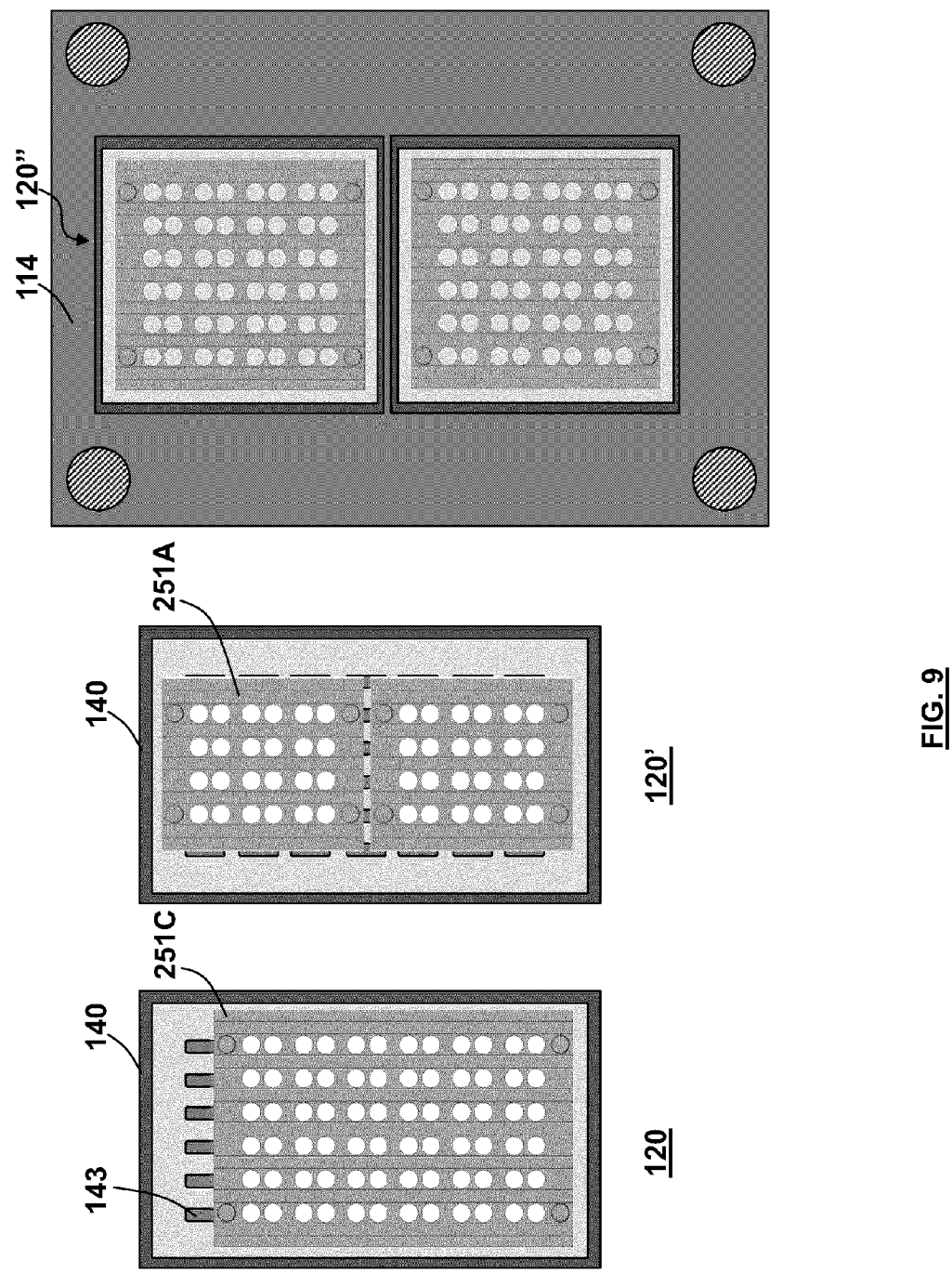
FIG. 9 depicts several non-limiting configurations of the mold formed selected mold conversion module(s) arranged in the standard mold receiver.

With reference to FIG. 9 there is depicted several non-limiting configurations of the mold 120, 120', 120" that are configured using the standard mold receiver 140 further including selected mold conversion module(s) 251A, 251B, 251C, 251D, 251E, 251F arranged therein. In particular, the mold 120 includes the standard mold receiver 140 with the mold conversion module 251C arranged therein. The mold 120' includes the standard mold receiver 140 along with two mold conversion modules 251A arranged therein. These examples serve to illustrate that the standard mold receiver 140 may accommodate one or several mold conversion modules—as need be. The last view show that is possible, if desired, to mount several of these molds 120" to the platen 114 in the mold clamp at the same time.

Non-Limiting Embodiments of a Molding Material Distributor:

The description shall now turn to various non-limiting embodiments of a conversion structure that includes a molding material distributor for use in a molding system, such as, for example, the molding system 100, 200 of FIGS. 1 and 10, that is configured to be converted to accommodate a variety of molds or mold conversion modules having different molding configurations, such as, for example, the mold conversion modules 251A, 251B, 251C, 251D, 251E, 251F shown in FIG. 8.

Figure 11:
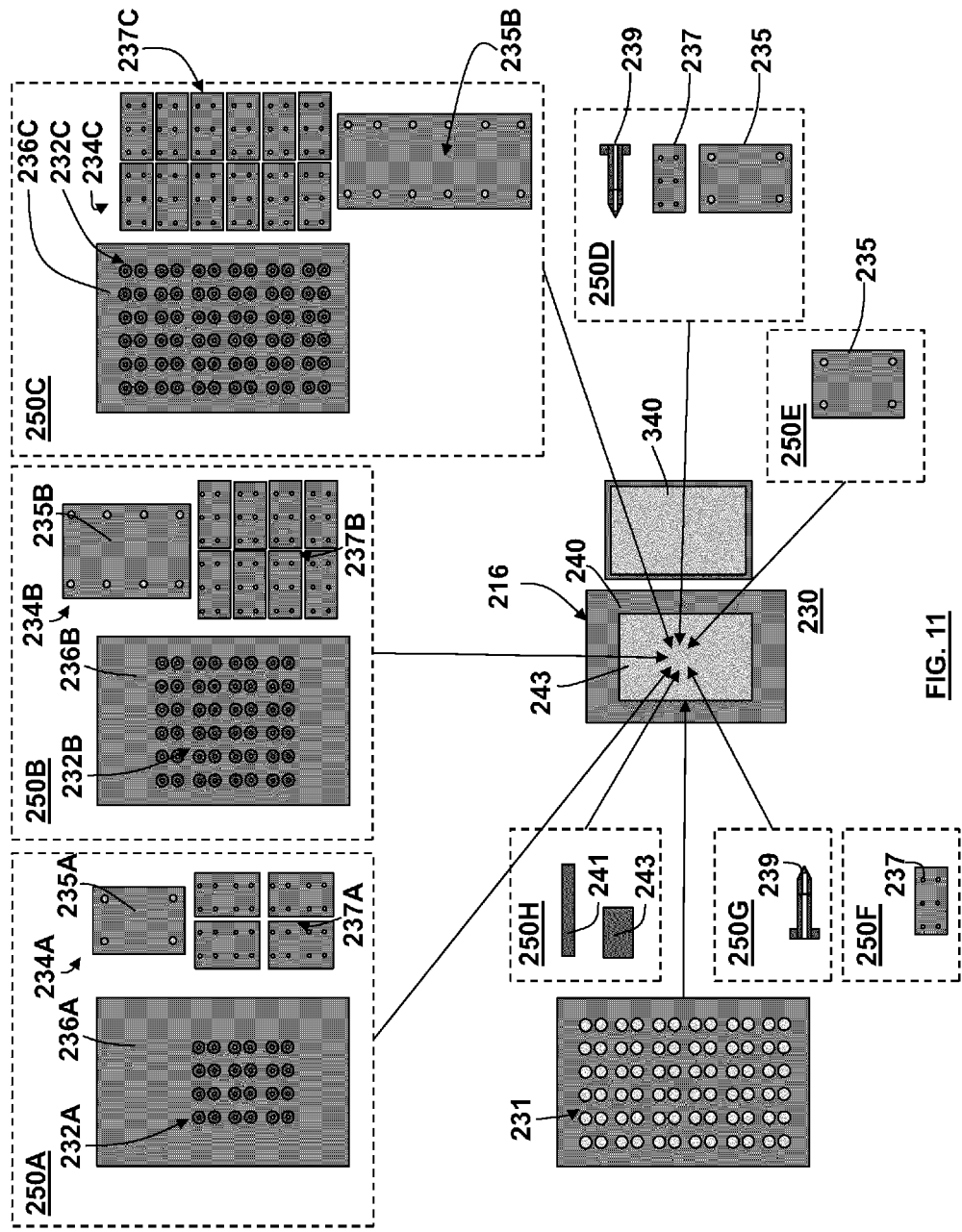
FIG. 11 depicts various distributor conversion modules for use with a standard distributor receiver according to a non-limiting embodiment with which to configure a molding material distributor.

A non-limiting example of a molding material distributor 230 may be better appreciated with reference to FIG. 11. The molding material distributor 230 may be configured using one of a standard distributor receiver 240 or 340 along with one or more selected distributor conversion module(s) 250A, 250B, 250C, 250D, 250E, 250F, 250G, 250H in cooperation therewith.

The standard distributor receiver 240 is shown to be defined within the platen 216 of the mold clamp 210 (further illustrated with reference to FIG. 10). The standard distributor receiver 240 defines a receptacle 238 and other standard interfaces to receive the distributor conversion modules 250A, 250B, 250C, 250D, 250F, 250G, 250H. The standard distributor receiver 340 is a similarly configured plate structure that is receivable, in use, on the platen 116 (FIG. 1) of the mold clamp 110.

The distributor conversion modules 250A, 250B, 250C are receivable in the standard distributor receiver 240 to configure the molding material distributor 230 for use with the mold conversion module 251A, 251B, 251C (FIG. 8), respectively. Each of the distributor conversion modules 250A, 250B, 250C includes a manifold array 234A, 234B, 234C and a nozzle assembly 236A, 236B, 236C, respectively. In use, a selected one of the manifold arrays 234A, 234B, 234C is received in the receptacle 238 of the standard distributor receiver 240 and the corresponding nozzle assembly 236A, 236B, 236C is then mounted thereon. The manifold arrays 234A, 234B, 234C each define a network of channels, not shown, within sub-manifolds 235A, 235B,

235C and main manifolds 237A, 237B, 237C for distributing, in use, molding material to a plurality of nozzles 232A, 232B, 232C that are associated with the nozzle assembly 236A, 236B, 236C.

The remaining distributor conversion modules 250D, 250E, 250F, 250G, 250H provide further non-limiting examples that may be selected from to convert one or more component of the molding material distributor 230 to accommodate for changes in the molding configuration of the mold (not shown). For example, it may be necessary to adjust melt channel sizing at one or more levels within the network of channels to optimize/match pressure rating and color change performance requirements of the mold. As such, the distributor conversion module 250D provides for conversion of the entirety of the network of channels (not shown), such as, for example, the diameter thereof, within the molding material distributor 230 and thus includes all required sub-manifold(s) 235, main manifold(s) 237 and nozzle(s) 239. Alternatively, the distributor conversion modules 250E, 250F, and/or 250G may be selected from to convert one or more of the sub-manifold 235, the main manifold 237 and/or the nozzle 239, respectively.

The standard distributor receivers 240, 340 may further include a standard nozzle plate 231. The standard nozzle plate 231 is configured to accommodate varying numbers of nozzles 239 for servicing molds or mold conversion modules of different cavitation. The foregoing is illustrated with reference to FIG. 12 wherein it may be appreciated that the number of nozzles 239 arranged in the standard nozzle plate 231 in the molding material distributor on the left is different than the one on the right. When removing one or more nozzles 239 and replacing the associated manifold array a shut-off support 241 may be inserted in its place, as shown, to maintain a structural integrity of the molding material distributor. Accordingly, a further distributor conversion module 250H (FIG. 11) may include one or more shut-off support(s) 241.

Figure 13:
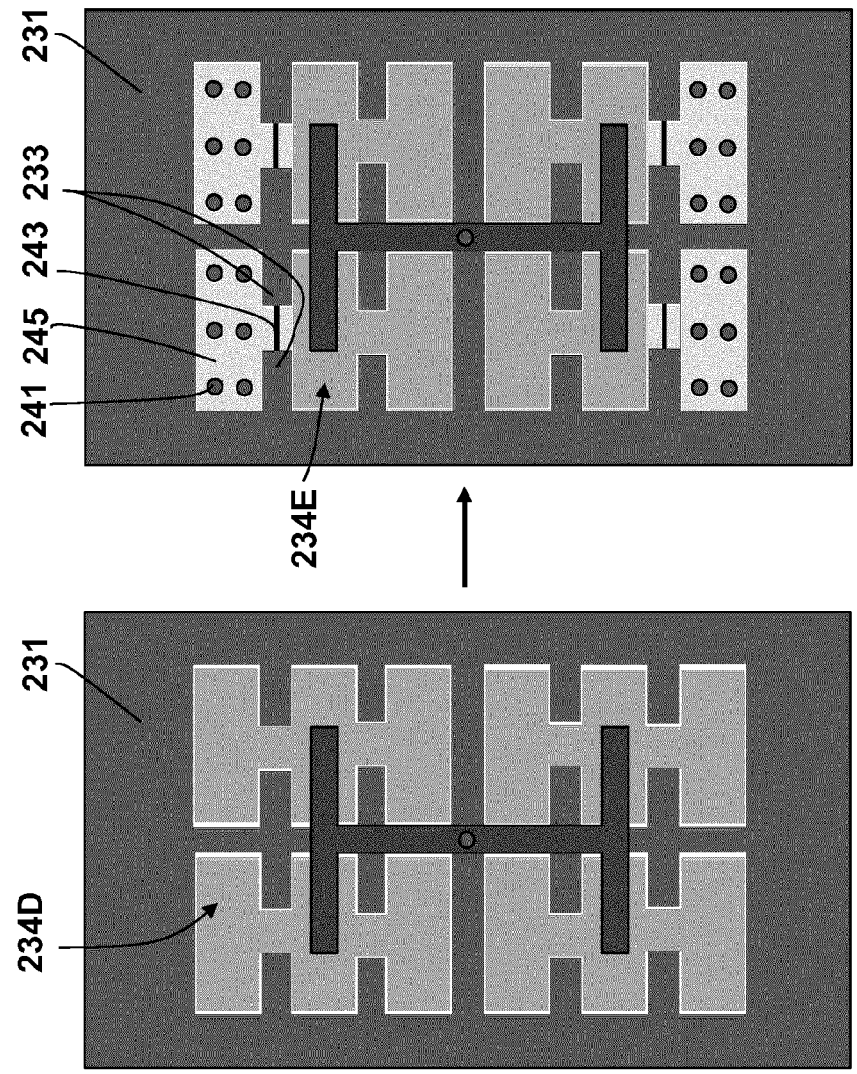

With further reference to FIG. 13 it may be appreciated that with conversion of the molding material distributor to feed molds or mold conversion modules of different cavitation that an overall size of the manifold array therein may change. In the non-limiting example depicted, the molding material distributor is converted with replacement of a manifold array 234D with a smaller manifold array 234E to feed a smaller number of nozzles (not shown), that is, 72 nozzles down to 48. Due to the fact that the manifold array 234E no longer generally occupies all of the space defined in a manifold pocket 245 defined in the standard nozzle plate 231 a set of thermal separators 243 may be inserted therein to isolate the space around the smaller manifold array 234E from the larger open volume of the manifold pocket 231. A technical effect of doing so may include isolation of the manifold array 234E from thermal imbalances that may otherwise result from air conduction and/or convection within the manifold pocket 245.

Figure 14:
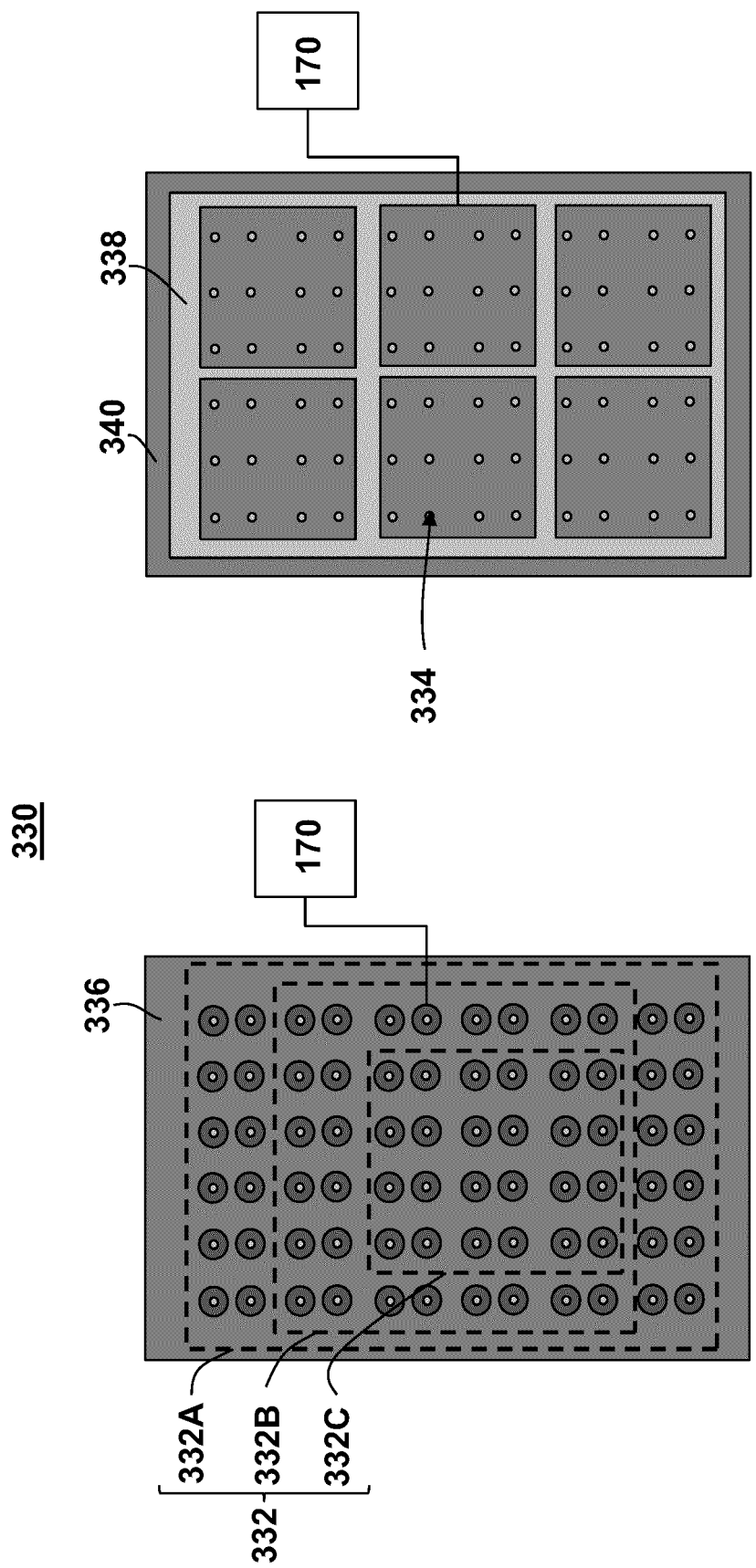

Another molding material distributor 330 is shown with reference to FIG. 14 that is configured to be convertible to accommodate one or more of the mold conversion modules 251A, 251B, 251C or other such mold or mold conversion module having a different molding configuration. The molding material distributor 330 is shown to include a standard distributor receiver 340, a manifold array 334 and a nozzle assembly 336.

The standard distributor receiver 340, previously shown in FIG. 11, is configured to be mounted, in use, to the platen 116 of the molding machine 100. The standard distributor receiver 340 provides a receptacle 338 within which to receive the manifold array 334.

The manifold array 334 defines a network of channels, not shown, for distributing molding material to a plurality of nozzles 332 that are associated with the nozzle assembly 336. More specifically, the manifold array 334 and the nozzle assembly 336 are configured to accommodate each of the mold conversion modules 251A, 251B, 251C (FIG. 8). In operation, a nozzle group 332A of the plurality of nozzles 332 are employed to feed the cavities 226A of the mold conversion modules 251A, a nozzle group 332B of the plurality of nozzles 332 are employed to feed the cavities 226B of the mold conversion modules 251B, and a nozzle group 332C of the plurality of nozzles 332 are employed to feed the cavities 226C of the mold conversion modules 251C. To accommodate this, a controller 170 is provided for controlling one or more devices, such as, heaters or valves, not shown, that are associated with the plurality of nozzles 332 and the manifold array 334 to selectively enable and disable operation thereof, at least in part, for conversion between the various configurations.

Figure 15:
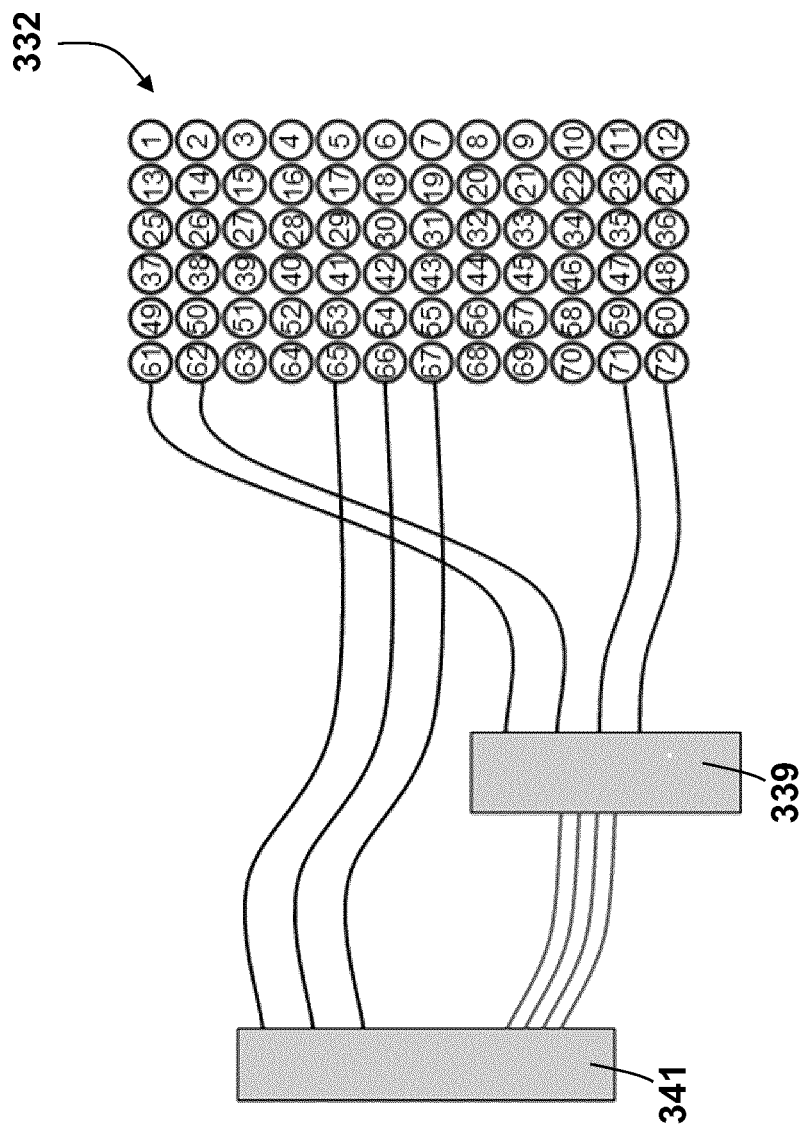

As depicted with reference to FIG. 15, to accelerate and generally facilitate conversion of the molding material distributor 330, electrical wiring for the various nozzle groups 332A, 332B, 332C (FIG. 14) of the plurality of nozzles 332 may be grouped together. A quick connector 339 that is easily accessible to an operator of the molding system may be provided to permit connection/disconnection of selected nozzle groups to a further bank of connectors 341 without needing to re-wire the entire molding material distributor.

Another such non-limiting embodiment is further developed with reference to the molding material distributor 430 that is shown with reference to FIG. 16. The molding material distributor 430 is configured to be convertible to accommodate a selected one of the mold conversion modules 251A, 251B, 251C. The molding material distributor 430 is shown to include the standard distributor receiver 340, a manifold array 434 and the nozzle assembly 336.

It may be appreciated that the molding material distributor 430 is similar in structure to the molding material distributor 330 except that it further includes one or more valve(s) 438 that are associated with the manifold 434A, 434B, 434C, 434D, 434E and 434F of the manifold array 434. The valves 438 are selectively positionable to isolate one or more of a network of channels 440 for conversion between the various molding configurations of the mold conversion modules 251A, 251B, 251C. Take for example the valve 438 that is associated with the manifold 434A.

The valve 438 may be positioned, either manually or by an actuator, not shown, that is under the control of the controller 170, to connect or isolate selected channels 440A, 440B from the network of channels 440.

Yet another non-limiting embodiment of a molding material distributor 530 is shown with reference to FIG. 17. The molding material distributor 530 is configured to be convertible to accommodate a selected one of the mold conversion modules 251A, 251B, 251C. The molding material distributor 530 is shown to include the standard distributor receiver 340, a modular manifold system 534 received in the receptacle 338 and the nozzle assembly 336.

The modular manifold system 534 includes a set of manifold modules 534A, 534B, 534C, 534D, 534E, 534F that are selectively connectable together to selectively define a network of channels 540 for distributing the molding material to a selection of a plurality of nozzles 332 that are associated with the nozzle assembly 336. For example, the manifold module 534A defines a part of the network of channels 540A that is required to feed the nozzle group 332A (FIG. 14) that feed, in use, the mold cavities 226A of the mold conversion modules 251A. With the addition of the manifold modules 534B, 534C, and 534D, the network of channels 540B is expanded to service the nozzle group 332B (FIG. 14) that feed, in use, the mold cavities 226B of the mold conversion modules 251B. With the addition of the manifold modules 534E, and 534F, the network of channels 540C is expanded to service the nozzle group 332C (FIG. 14) that feed, in use, the mold cavities 226C of the mold conversion modules 251C. One or more valves 542 or other flow stopping means may be provided in the manifold modules 534A and 534D for isolating portions of the network of channels 540 when one or more of the manifold modules 534B, 534C, 534D, 534E, or 534F are not installed.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. Conversion structure for use in a molding system, comprising:
a mold receiver that is configured to receive a mold conversion module for converting a molding configuration of a mold;
the mold receiver includes a guide that is configured to cooperate with a complementary guide on the mold conversion module for accommodating repositioning, in use, of the mold conversion module between a molding position and an ejection position;
the mold receiver further includes a shutter device that is operable, in use, to selectively permit the repositioning of the mold conversion module.

2. The conversion structure of claim 1, wherein:
the mold receiver is configured to accommodate several mold conversion modules arranged therein.

3. The conversion structure of claim 1, wherein:
the mold receiver is configured for mounting to a platen of a mold clamp of the molding system.

4. The conversion structure of claim 1, wherein:
the mold receiver is integrated with a platen of a mold clamp of the molding system.

5. The conversion structure of claim 1, wherein:
the mold receiver is configured to accommodate repositioning of the guide to accommodate mold conversion modules with the complementary guide in different locations thereon.

6. The conversion structure of claim 1, wherein:
the shutter device includes a shutter member that is configured to cooperate with a link member on the mold conversion module, wherein the shutter member is repositionable, in use, to selectively permit the repositioning of the mold conversion module.

7. The conversion structure of claim 1, wherein:
the mold receiver further includes an ejector box for framing the mold conversion module at least in part.

8. The conversion structure of claim 1, wherein:
the mold receiver includes a mold base that defines one or more interfaces that are configured to cooperate with one or more complementary interfaces that are defined on the mold conversion module.

9. The conversion structure of claim 8, wherein:
the mold base includes a plurality of plates each of which defines the one or more interfaces.

10. The conversion structure of claim 9, wherein:
the plurality of plates includes an inner core plate, an outer core plate and a stripper plate that define a inner core interface, a outer core interface and a stripper interface, respectively, for cooperating with a complementary inner core interface, a complementary outer core interface and a complementary stripper interface that are defined on an inner core, an outer core and a stripper sleeve, respectively, of a first stack portion of the mold conversion module.

11. The conversion structure of claim 8, wherein:
the mold base is a cavity plate that defines a cavity interface for cooperating with a complementary cavity interface that is defined on a cavity insert of a second stack portion of the mold conversion module.

12. Conversion structure for use in a molding system, comprising:
a mold conversion module that is configured to be received in a mold receiver for converting a molding configuration of a mold;
the mold conversion module includes a complementary guide that is configured to cooperate with a guide on the mold receiver for accommodating, in use, repositioning of the mold conversion module between a molding position and an ejection position;
the mold conversion module is configured to cooperate with a shutter device that is associated with the mold receiver, wherein the shutter device is operable, in use, to selectively permit the repositioning of the mold conversion module.

13. The conversion structure of claim 12, wherein:
the mold conversion module converts at least one of:
a cavitation of mold cavities in the mold;
a pitch of the mold cavities in the mold.

14. The conversion structure of claim 12, wherein:
the mold conversion module includes a link member that is configured to cooperate with a shutter member of the shutter device, wherein the shutter member is repositionable, in use, to selectively permit the repositioning of the mold conversion module.

15. The conversion structure of claim 12, wherein:
the mold conversion module includes a mold base having a first stack portion associated therewith, wherein the first stack portion is configured to define part of a mold cavity.

16. The conversion structure of claim 15, wherein:
the mold base includes a plurality of plates each of which defines one or more interfaces.

17. The conversion structure of claim 16, wherein:
the plurality of plates includes an inner core plate, an outer core plate and a stripper plate that define a inner core interface, a outer core interface and a stripper interface, respectively, for cooperating with a complementary inner core interface, a complementary outer core interface and a complementary stripper interface that are defined on an inner core, an outer core and a stripper sleeve, respectively, of the first stack portion.

18. The conversion structure of claim 12, wherein:
the mold conversion module includes a mold base having a second stack portion associated therewith.

19. The conversion structure of claim 18, wherein:
the mold base is a cavity plate that defines a cavity interface for cooperating with a complementary cavity interface that is defined on a cavity insert of the second stack portion.

20. The conversion structure of claim 12, wherein:
the mold conversion module includes one or more of a first stack portion and a second stack portion that define one or more complementary interfaces that are configured to cooperate with one or more interfaces that are defined on the mold receiver.

21. The conversion structure of claim 20, wherein:
the first stack portion includes an inner core, an outer core and a stripper sleeve that define a complementary inner core interface, a complementary outer core interface and a complementary stripper interface, respectively, that are configured to cooperate, in use, with a inner core interface, a outer core interface and a stripper interface, respectively, that are defined on an inner core plate, an outer core plate and a stripper plate of the mold receiver.

22. The conversion structure of claim 20, wherein:
the second stack portion includes a cavity insert that defines a complementary cavity interface that is configured to cooperate, in use, with a cavity interface that is defined on a cavity plate of the mold receiver.

23. A mold, comprising:
a mold receiver; and
a mold conversion module;
the mold receiver and the mold conversion module being configured to cooperate, wherein the mold conversion module is receivable in the mold receiver for converting a molding configuration of the mold;
the mold receiver includes a guide that is configured to cooperate with a complementary guide on the mold conversion module for accommodating repositioning, in use, of the mold conversion module between a molding position and an ejection position;
the mold receiver further includes a shutter device that is operable, in use, to selectively permit the repositioning of the mold conversion module.

24. The mold of claim 23, wherein:
the mold conversion module
converts at least one of:
a cavitation of mold cavities in the mold;
a pitch of the mold cavities in the mold.

25. The mold of claim 23, wherein:
the mold receiver is configured for mounting to a platen of a mold clamp of a molding system.

26. The mold of claim 23, wherein:
the mold receiver is integrated with a platen of a mold clamp in the molding system.

27. The mold of claim 23, wherein:
the mold receiver is configured to accommodate repositioning of the guide to accommodate another mold conversion module.

28. The mold of claim 23, wherein:
the shutter device includes a shutter member that is configured to cooperate with a link member on the mold conversion module, wherein the shutter member is repositionable, in use, to selectively permit the repositioning of the mold conversion module.

29. The mold of claim 23, wherein:
the mold receiver further includes an ejector box for framing the mold conversion module at least in part.

30. The mold of claim 23, wherein:
the mold conversion module includes a mold base having a first stack portion associated therewith, wherein the first stack portion is configured to define part of a mold cavity.

31. The mold of claim 30, wherein:
the mold receiver is configured to accommodate several mold conversion modules arranged therein.

32. The mold of claim 30, wherein:
the mold base includes a plurality of plates each of which defines one or more interfaces.

33. The mold of claim 32, wherein:
the plurality of plates includes an inner core plate, an outer core plate and a stripper plate that define a inner core interface, a outer core interface and a stripper interface, respectively, for cooperating with a complementary inner core interface, a complementary outer core interface and a complementary stripper interface that are defined on an inner core, an outer core and a stripper sleeve, respectively, of the first stack portion.

34. The mold of claim 23, wherein:
the mold conversion module includes a mold base having a second stack portion associated therewith.

35. The mold of claim 34, wherein:
the mold base is a cavity plate that defines a cavity interface for cooperating with a complementary cavity interface that is defined on a cavity insert of the second stack portion.

36. The mold of claim 23, wherein:
the mold conversion module includes one or more of a first stack portion and a second stack portion that define one or more complementary interfaces that are configured to cooperate with one or more interfaces that are defined on the mold receiver.

37. The mold of claim 36, wherein:
the first stack portion includes an inner core, an outer core and a stripper sleeve that define a complementary inner core interface, a complementary outer core interface and a complementary stripper interface, respectively, that are configured to cooperate, in use, with a inner core interface, a outer core interface and a stripper interface, respectively, that are defined on an inner core plate, an outer core plate and a stripper plate of the mold receiver.

38. The mold of claim 36, wherein:
the second stack portion includes a cavity insert that defines a complementary cavity interface that is configured to cooperate, in use, with a cavity interface that is defined on a cavity plate of the mold receiver.

* * * * *